United States Patent
Segman (10) Patent No.: US 6,239,842 B1
(45) Date of Patent: May 29, 2001

(54) METHOD OF DE-INTERLACING VIDEO SIGNALS USING A MIXED MODE SPATIAL AND TEMPORAL APPROXIMATION TECHNIQUE

(75) Inventor: Yosef Segman, Zichron Yaacov (IL)

(73) Assignee: Oplus Technologies Ltd., Haifa (IL)

( * ) Notice: Subject to any disclaimer, the term of this patent is extended or adjusted under 35 U.S.C. 154(b) by 0 days.

(21) Appl. No.: 09/215,188

(22) Filed: Dec. 18, 1998

(51) Int. Cl.[7] .................................................. H04N 7/01
(52) U.S. Cl. .......................... 348/448; 348/441; 348/459
(58) Field of Search ................................... 348/448, 441, 348/458, 459, 443, 445, 452, 454, 910; H04N 7/01

(56) References Cited

U.S. PATENT DOCUMENTS

| | | |
|---|---|---|
| 4,639,763 | 1/1987 | Willis et al. . |
| 5,373,323 | 12/1994 | Kwon . |
| 5,381,182 | 1/1995 | Miller et al. . |
| 5,473,383 * | 12/1995 | Sezan et al. ........................ 348/452 |
| 5,483,288 * | 1/1996 | Hong .................................. 348/448 |
| 5,488,422 * | 1/1996 | Faroudja et al. .................... 348/448 |
| 5,521,644 * | 5/1996 | Sezan et al. ........................ 348/452 |
| 5,559,905 | 9/1996 | Greggain et al. . |
| 5,579,053 * | 11/1996 | Pandel ................................ 348/448 |
| 5,602,654 * | 2/1997 | Patti et al. ......................... 358/461 |
| 5,621,470 * | 4/1997 | Sid-Ahmed ........................ 348/448 |
| 5,650,824 | 7/1997 | Huang . |
| 5,661,525 * | 8/1997 | Kovacevic et al. ................. 348/452 |
| 5,663,765 | 9/1997 | Matsuse et al. . |
| 5,717,466 | 2/1998 | Pan et al. . |
| 5,742,350 | 4/1998 | Pan et al. . |
| 5,748,116 | 5/1998 | Chui et al. . |
| 5,748,250 | 5/1998 | Markandey et al. . |
| 5,793,435 * | 8/1998 | Ward et al. ........................ 348/448 |
| 5,943,099 * | 8/1999 | Kim ................................... 348/448 |
| 5,959,681 * | 9/1999 | Cho ................................... 348/452 |
| 5,995,154 * | 11/1999 | Heimburger ....................... 348/448 |

\* cited by examiner

Primary Examiner—Reinhard J. Eisenzopf
Assistant Examiner—Jean W. Désir
(74) Attorney, Agent, or Firm—Mark M. Friedman (57) ABSTRACT

A method of de-interlacing interlaced video formats using a mixed mode spatial and temporal approximation technique. This method can be implemented with input of known pixel values obtained from only two fields, featuring the current spatial field containing missing pixels, and either of two neighbor temporal fields containing known pixels. Decision steps requiring evaluation of a series of logical operations lead to assignment of values to missing spatial pixels. There is a feedback step of approximated values of missing pixels from one cycle to the next cycle of approximation of missing pixel values. This method is applicable to a variety of video interlaced signals, including interlaced RGB component signals, and video signals containing luminance and chrominance components. Video de-interlacing according to the present invention is an efficient way of having image processing devices operating with interlaced technology be compatible with visual display monitors operating with de-interlaced (progressive) high resolution scan format systems. Moreover, the method of this invention is applicable to real time and off-line modes of operation of video and television systems currently using interlaced scanning formats.

19 Claims, 5 Drawing Sheets

(1) Initialize value of first output pixel.
   (a) first initialization, set output value of previous pixel value (Previous-Result) = 0.
   Define threshold constants.
   - $A_i$ = (threshold constant i), for i = 1 to 8.
   Define pixel luminance levels.
   - B = Darkness level (black level).    - W = Brightness level (white level).

(2) Identify line of missing pixels within spatial field at a given set time.
   (a) set-up matrix representation of pixels in grid space (Figure 3).
   - missing spatial pixels located in horizontal line 42 in Line (k) 44.

(3) Identify current line of pixels with known values within previous temporal field or next temporal field, or both.
   (a) refer to matrix representation of pixels in grid space (Figure 3).
   - temporal pixels with values located in Line (k) 44, in previous temporal Field ($Y_{t-1}$) 34, having values $g_1$, $g_2$, $g_3$.
   - temporal pixels with values located in Line (k) 44, in next temporal Field ($Y_{t+1}$) 36, having values $h_1$, $h_2$, $h_3$.

(4) Identify a missing pixel in the line of missing pixels, whose value is to be approximated.
   (a) refer to matrix representation of pixels in grid space (Figure 3).
   - missing spatial pixel P 46 located in Line (k) 44 of missing pixels, in spatial Field ($Y_t$) 32.

(5) Determine directional averages of spatial neighbors of missing pixel.
   (a) pixel values from matrix representation of pixels in grid space (Figure 3).
   - spatial pixels with values located in Line (k - 1) 38, and in Line (k + 1) 40, in current spatial Field ($Y_t$) 32, having values $x_1$, $x_2$, $x_3$, and $x_4$, $x_5$, $x_6$.
   (b) evaluate directional averages, $m_i$, of spatial pixels with values, where
   $m_1 = a_1 x_1 + a_2 x_6$, $m_2 = b_1 x_2 + b_2 x_5$, and $m_3 = c_1 x_3 + c_2 x_4$, with
   $a_1 + a_2 = 1$, $b_1 + b_2 = 1$, and $c_1 + c_2 = 1$, where coefficients $a_i$, $b_i$, and $c_i$ are positive constants.

(6) Determine averages of temporal pixels in same line and column of missing pixel.
   (a) pixel values from matrix representation of pixels in grid space (Figure 3).
   - temporal pixel with a value located in Line (k) 44, in previous temporal Field ($Y_{t-1}$) 34, having value $g_2$, and temporal pixel with a value located in Line (k) 44, in next temporal Field ($Y_{t+1}$) 36 having value $h_2$.
   (b) evaluate the average, $m_T$, of temporal pixels with values, where $m_T = d_1 g_2 + d_2 h_2$, with $d_1 + d_2 = 1$, and where coefficients $d_1$ and $d_2$ are positive constants, greater than or equal to zero.
   (c) evaluate the average, $n_T$, of temporal pixels with values, where $n_T = e_1 g_1 + e_2 h_1$, with $e_1 + e_2 = 1$, and where coefficients $e_1$ and $e_2$ are positive constants, greater than or equal to zero.

FIG. 5/1

(7) Determine the standard deviations of spatial pixels with known values, in the same field as the missing spatial pixel.
 (a) evaluate standard deviations, Sigma i, for i = 1 to 3, where
 Sigma 1 = $s_1$ [abs ($x_1 - m_1$)], Sigma 2 = $s_2$ [abs ($x_2 - m_2$)], and
 Sigma 3 = $s_3$ [abs ($x_3 - m_3$)], where $s_i$ (for i = 1 to 3) is a positive constant, and equations of Sigma i are approximations to the standard deviations.

(8) Determine the minimum standard deviation of known spatial pixels.
 (a) evaluate the minimum standard deviation, Min-Sigma, from the set of
 Sigma i (i = 1 to 3), where Min-Sigma = Min [Sigma i] for 1 <= i <= 3.
 - define $m_j$ (where j = i) equal to the average of spatial pixel values related to Min-Sigma.

(9) Determine the standard deviation between the average of neighbor temporal pixels and the minimum-related average of current spatial pixels.
 (a) evaluate the standard deviation, Sigma, where
 Sigma = abs ($m_T - m_j$), where $m_T$ and $m_j$ were previously evaluated.

(10) Decide from potential values to the missing spatial pixel, and assign a value to the missing spatial pixel.
 (a) evaluate logical operations of linear combinations of averages, standard deviations, minimum standard deviations, absolute values of differences between average values of pixels and known values of pixels, and known values of pixels, with previously defined threshold constants, and pixel luminance levels.
 (b) assign the value of the correct decision to the missing spatial pixel.
 - If (i) Sigma <= (K0 + Min-Sigma), where $-C_0$ <= K0 < $C_0$, or
 (ii) Min-Sigma >= (W - K1), where $-C_1$ <= K1 < $C_1$, or
 (iii) abs ($m_T - x_1$) < A1, or (iv) abs ($m_T - x_2$) < A2, or
 (v) abs ($m_T - x_3$) < A3, or (vi) abs ($m_T - x_4$) < A4, or
 (vii) abs ($m_T - x_5$) < A5, or (viii) abs ($m_T - x_6$) < A6, or
 (ix) $m_T$ <= (B + K2), where $-C_2$ <= K2 < $C_2$, or
 (x) [(Previous-Result) - $n_T$ <= A6] and [$m_T$ >= W - A7], then:
  - If Sigma < A8, value of the missing spatial pixel (P 46 in Fig. 3) is assigned as: P = ($m_T + m_j$) * K3, where 0 < K3 < 1.
  - If Sigma >= A8, value of the missing spatial pixel (P 46 in Fig. 3) is assigned as: P = $m_T$.
 - If none of (i) through (x) is correct, then value of missing spatial pixel (P 46 in Fig. 3) is assigned as: P = $m_j$.

(11) Save value of missing pixel, P, for next feedback step (Step (12)).
 (a) assign value of current missing pixel to previous result, as
 (Previous-Result) = P, for use in initialization of the next feedback cycle.

(12) Approximate a value of a next missing spatial pixel by feedback, by repeating Steps (1) through (11).

FIG. 5/2

METHOD OF DE-INTERLACING VIDEO SIGNALS USING A MIXED MODE SPATIAL AND TEMPORAL APPROXIMATION TECHNIQUE

FIELD AND BACKGROUND OF THE INVENTION

The present invention relates to processing of video signals. In particular, this invention relates to a method of de-interlacing interlaced video formats using a mixed mode spatial and temporal approximation technique.

Video signals are currently represented as sequences of a) fields in case of interlace scan refresh or b) frames according to non-interlace or progressive scan refresh. In the interlaced scan format, a single image (frame) is represented using a pair of fields. One field of the pair features pixels located in alternate rows (odd numbered horizontal lines, for example) of the field matrix. The second field of the pair features pixels located in the same field matrix only in the corresponding horizontal lines (even numbered horizontal lines, for example) which were missing pixels in the first field, such that portions of the image not represented in the first field are represented in the second field. In the interlaced scan format, each field of image data is scanned twice, once for the odd numbered horizontal lines of the field, and another time for the even numbered horizontal lines of the field, in order to have all of the horizontal lines of the odd field followed by all of the horizontal lines of the even field. The pair of fields of odd and even horizontal lines in interlaced video constitute the frame (one full resolution picture or image). In contrast, in the de-interlaced or progressive scan format, an image is represented in its entirety using only a single field which includes pixels in all horizontal lines of the field matrix. Here, each frame (field) of image data is scanned once from the top horizontal line to the bottom horizontal line without requiring interlacing action between two fields.

In the interlace scan format, the first and second fields of a pair are scanned consecutively on a video display monitor at a rate of 60 fields per second, in order to reconstruct single image frames on the display at the industry interlaced scan standard of 30 frames per second. In more recently developed video representation technique using de-interlacing (progressive scan format) format, frames are progressively scanned on a display at the standard progressive display rate of 60 frames per second.

Application of current interlace scan format to television, includes the NTSC (National Television System Committee) and the PAL (Phase Alternation by Line) systems. In the NTSC format, there are 262.5 horizontal scanning lines per field (including one odd numbered field, and one even numbered field), translating to 525 scanning lines per frame, with an established scan rate of (60 fields) 30 frames per second. In the PAL format, there are 312.5 horizontal scanning lines per field (including one odd numbered field, and one even numbered field), translating to 625 scanning lines per frame, with an established scan rate of (50 fields) 25 frames per second.

New display systems such as CRT (PC monitors), flat liquid crystal device (LCD) panels, plasma display panels (PDP), and video equipment, including cameras, broadcast station transmitters and high definition television (HDTV) desktop or workstation display monitors are using de-interlaced (progressive) high resolution scan format systems such as VGA(480 lines×640 columns per frame), SVGA(600 lines×800 columns per frame), XGA(768 lines× 1024 columns per frame), and UXGA(1200 lines×1600 columns per frame) to scan and display image data. An example showing the need for de-interlacing interlaced video data, is a typical LCD display having 480 horizontal scanning lines with 640 dots per scanning line (VGA system). Since LCD display systems are designed to be scanned in the de-interlaced format, when the need is to display NTSC (525 lines per frame) and PAL (625 lines per frame) image signals on an LCD display, interlaced image signals need to be converted into de-interlaced image signals for proper display.

It is known that higher quality image reproductions are obtained by using de-interlaced scanned format rather than interlaced scan format, because interlaced displays are more likely to exhibit visual artifacts (such as line crawl on diagonal edges of an image, and interline flicker on horizontal edges of an image) than de-interlaced scan displays. As a result, there has been substantial effort towards developing methods of converting or de-interlacing interlaced video image data suitable for display on de-interlaced or progressive scan format devices.

Several conversion or de-interlacing methods, devices, and systems for video image processing have been developed, most of which feature one or a more of a variety of spatial, temporal, or spatio-temporal interpolation processing for estimating the values of missing pixels in an interlaced frame. The relative suitably of these techniques depends on the resulting image quality. Moreover, different interpolation techniques and systems work better under different conditions.

U.S. Pat. No. 5,661,525 issued to Kovacevic et al., features a method for de-interlacing an interlaced video frame sequence using interpolation of spatial and temporal pixels for estimating values of missing pixels. The interpolations are weighted according to the errors each one introduces for generating the approximations of missing pixel values for a de-interlaced frame. In these interpolations, three fields of pixels are used, i.e., the current spatial field and the two neighboring (immediately preceding and following) fields of pixels are used for estimating values of missing pixels in the current spatial field. In U.S. Pat. No. 5,793,435 issued to Ward et al., a de-interlacing system for converting an interlaced video to a progressive video features a variable coefficient, non-separable spatio-temporal interpolation filter. Reference and offset video signals are weighted together with filter coefficients in the spatio-temporal interpolation filter, to produce an interpolated video signal. The interpolated video signal is interleaved with the reference video signal, suitably delayed to compensate for filter processing time, to produce the de-interlaced video signal. U.S. Pat. No. 5,621,470 issued to Sid-Ahmed makes use of interpolation in an inter-pixel and inter-frame arrangement and incorporates a 3D (low pass) filter to support such actions. The 3D interpolator produces twice the number of pixels along each horizontal line, twice the number of lines in each frame and double the number of frames per second. Another interpolation filter apparatus applied to de-interlacing is presented in U.S. Pat. No. 5,559,905 issued to Greggain et al., in which interpolation of a stream of input pixels involves a filter providing a means for aligning the stream of input pixels and the first derived stream of sampled (output) pixels at the boundaries of the image, at a predetermined interpolation rate. U.S. Pat. No. 5,650,824 issued to Si Jun Huang, includes the use of a filter which performs linear interpolation on interlaced image data, involving two neighboring field samples for each odd field and even field input.

An example of a device for implementing an interpolation method of de-interlacing video signals is given in U.S. Pat. No. 5,717,466 issued to Shao Wei Pan et. al., featuring an enhanced video circuit for performing (linear and non-linear) non-uniform interpolation of video scan lines. A real-time video system which incorporates the circuit device featured in U.S. Pat. No. 5,717,466, is shown in U.S. Pat. No. 5,742,350, issued to the same.

Current methods of de-interlaced video signals are notably limited with respect to de-interlacing video images featuring textual data. Standard approximation methods currently used for de-interlacing interlaced video signals are typically based on interpolation techniques, for evaluating missing pixels in interlaced fields of video signals. These interpolation techniques require the use of no less than three fields of pixels with known values for estimating values of missing pixels.

A more accurate and comprehensive approximation method for de-interlacing interlaced video signals involves usage of logical operations, for making decisions leading to assignment of highly accurate values of missing pixels, included in a technique which involves extrapolation, and not only interpolation, of missing pixels in interlaced fields of video signals. Moreover, a de-interlacing method which requires less than three fields of pixels with known values for approximating values of missing pixels would translate to a significant savings of resources required for de-interlacing. A method requiring input information from two, instead of three, fields of pixels with known values would require measurably less data processing resources including hardware, software, memory, and calculation time. There is thus a need for, and it would be useful to have, an accurate and comprehensive method of de-interlacing interlaced video signals currently used in standard video and television devices, which is generally applicable to both numerical and textual image data, and which requires fewer resources. Moreover, there is a need for such an improved de-interlacing method applicable to either real time or off-line mode of operation of video and television signal de-interlacing.

SUMMARY OF THE INVENTION

The present invention relates to a method of de-interlacing interlaced video signals using a mixed mode spatial and temporal approximation technique.

Hereinafter, the term 'current' is used with respect to a given set time of de-interlacing an interlaced video signal, and is used as a temporal reference point in describing the approximation method of the present invention, whether the interlaced video signal be in real time or off-line mode of operation. Hereinafter, the term 'logical operations' refers to usage of the known logical operators of 'less than', 'less than or equal to', 'greater than', 'greater than or equal to', 'and', 'or', and 'xor'. Spatial pixels of a current spatial field of pixels, and pixels of the previous and/or the following temporal fields, are used as inputs of the approximation method.

The method of video de-interlacing of the present invention is based on a unique mixed mode spatial and temporal approximation technique, involving approximating missing pixels of interlaced (half) fields required to form a single de-interlaced frame (raster) of pixels positioned in grid space of a visual display device. The method of the present invention provides the unique capability of implementation using input information from only two, instead of using the conventional three fields of pixels with known values, for approximating values of missing pixels in a current spatial field, i.e., in addition to the current spatial field featuring known and missing values of spatial pixels, only one neighboring temporal field having temporal pixels with known values need be used for performing all necessary calculations, determinations, and evaluations for completely de-interlacing an interlaced video signal. The method of the present invention involves unique usage of logical operations, for making decisions leading to assignment of highly accurate values of missing pixels. Additionally, the method of the present invention includes a feedback step for continuation of the approximation method of evaluating a value of a next missing pixel, following evaluation of a previous missing pixel.

A preferred embodiment of a method of video de-interlacing of the present invention features the following principle steps: (1) initialization of the value of the first output pixel, and definition of threshold constants and pixel luminance levels (where luminance refers to brightness or darkness), to be used in a later decision step in evaluating missing pixels, (2) identification of a line of missing pixels within a spatial field at a set time, (3) identification of a current line of pixels with known values within the previous temporal field or the next temporal field, or within both the previous temporal field and the next temporal fields, (4) identification of a missing spatial pixel in the line of missing spatial pixels, (5) determination of directional averages of the spatial neighbors of the missing spatial pixel, in the current spatial field, at the set time, (6) determination of averages of temporal pixels located in the same line and column of the missing spatial pixel, but in previous and/or next temporal fields, (7) determination of standard deviations of the spatial pixels with known values, located in the same field as the missing spatial pixel, (8) determination of the minimum standard deviation of the spatial pixels. (9) determination of the standard deviation between the average of the neighboring temporal pixels, and the average of the current spatial pixels related to the minimum standard deviation of step (8), (10) deciding from several potential values to the missing spatial pixel, based on evaluation of a series of logical operations of previously determined values, leading to assignment of a value to the missing spatial pixel, (11) saving the value of step (10), for use in performing the following feedback step for approximating a value of a next missing spatial pixel, and (12) approximation of a value of a next missing spatial pixel by feedback, by repeating steps (1) through (11).

There are several ways to represent color video. Currently, video broadcasts are based on formats such as YUV, and YCrCb, where Y is known as the luminance (brightness or darkness) component and UV or CrCb are different chrominance (color) components. The above outlined method is generally applicable to any type of interlaced video signal format, including interlaced color video formats.

The method of the present invention, may be similarly implemented for the case of video interlaced RGB signals, whereby the above method (steps (1) through (11)) is repeated for each color component (red, green, and blue).

The method of the present invention, may be similarly implemented for the case of video interlaced signals represented by luminance and chrominance components (for example, YUV, YCrCb), whereby the above method (steps (1) through (11)) is repeated only for the luminance components (the Y part), and an approximation is performed for the chrominance components (the CrCb part), from information obtained from the decision step (10).

According to the present invention, there is provided a method for de-interlacing an interlaced video format, the method comprising the steps of: (a) receiving the interlaced video format featuring a sequence of fields of pixels to be de-interlaced, and (b) using a current spatial field featuring missing spatial pixels and the spatial pixels with known values, located in the sequence of the fields, and at least one temporal field featuring temporal pixels with known value, located in the sequence of the fields, for determining values of the missing pixels of the current spatial field.

According to the present invention, there is provided a method for de-interlacing an interlaced video format, the method comprising the steps of: (a) receiving the interlaced video format featuring a sequence of fields of pixels to be de-interlaced, (b) evaluating logical operations of linear combinations of values selected from the group consisting of averages of known values of spatial pixels, averages of the known values of temporal pixels, standard deviations of the known values of the spatial pixels, standard deviation of the known values of the temporal pixels, minimum of the standard deviations of the known values of the spatial pixels, absolute values of differences between the averages of the known values of the temporal pixels and the known values of the spatial pixels, the known values of the spatial pixels, and a plurality of constants, the logical operations selected from the group consisting of greater than, greater than or equal to, less than, less than or equal to, 'and', 'or', and 'xor', and (c) deciding upon assignment of values to missing spatial pixels according to results of the logical operations.

The method of video de-interlacing of the present invention, leads to the capability of using image processing devices operating with interlaced technology to be compatible with visual display monitors operating with de-interlaced (progressive) high resolution scan format systems. Moreover, the method of video de-interlacing of the present invention is applicable to either real time or off-line mode of operation of video and television signal de-interlacing.

The present invention could be implemented by hardware or by software on any operating system of any firmware or a combination thereof. For example, as hardware, the invention could be implemented as a chip or a circuit. As software, the invention could be implemented as a plurality of software instructions being executed by a computer using any suitable operating system. In any case, the steps of the method of the invention could be described as being performed by a data processor, such as a computing platform for executing a plurality of instructions, regardless of the implementation of the present invention.

BRIEF DESCRIPTION OF THE DRAWINGS

The invention is herein described, by way of example only, with reference to the accompanying drawings, wherein:

FIG. 5 (comprising two pages as FIG. 5/1, and FIG. 5/2 as continuation of FIG. 5/1) is a flow diagram of an exemplary preferred embodiment for implementing the method of the video de-interlacing method according to the present invention.

DESCRIPTION OF THE PREFERRED EMBODIMENTS

The present invention is of a method of de-interlacing interlaced video signals using a mixed mode spatial and temporal approximation method. The approximation method includes a decision step, featuring evaluation of a series of logical operations leading to a decision of assignment of a value to a missing pixel in an interlaced field of a video signal, and assignment of a value to that missing pixel based on the correct comparison. The approximation method includes feedback of the approximated value of a previous missing pixel, to the initial step of the approximation method, for approximation of a next missing pixel.

The components and operation of a method of de-interlacing video signals according to the present invention are better understood with reference to the drawings and the accompanying description. It is to be noted that illustrations of the present invention shown here are for illustrative purposes only and are not meant to be limiting.

Figure 1A:
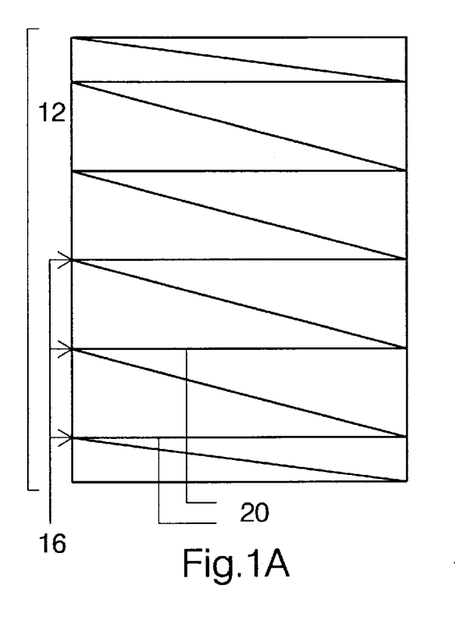
FIG. 1A is an illustration of an odd field (one half of odd lines of a single frame) of an interlaced scan format.

Referring now to the drawings, FIG. 1 is an illustration of a pair 10 of an odd field 12 and of an even field 14 of an interlaced scanned format. FIG. 1A is an illustration of the odd field 12, featuring one half of odd lines of a single frame of an interlaced scan format (i.e., each frame includes one odd field and one even field). In terms of an electronic device providing visual display of video signals, the odd field 12 of the pair 10 features lines of pixels 20, located in alternate rows 16 (odd numbered horizontal lines, for example) of grid space, also corresponding to a field matrix representation (FIG. 3).

Figure 1B:
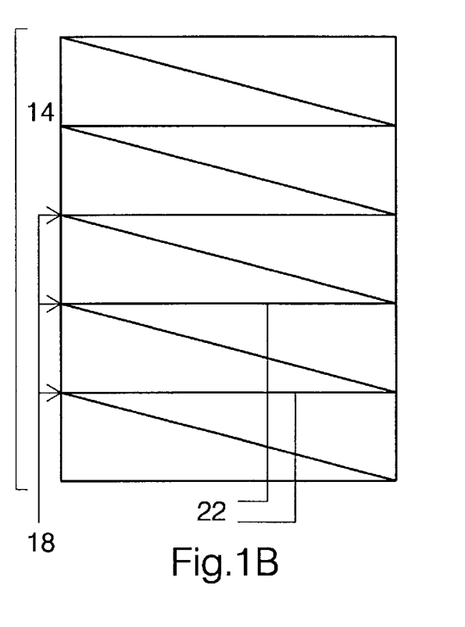
FIG. 1B is an illustration of an even field (one half of even lines of a single frame) of an interlaced scanned format.

FIG. 1B is an illustration of the even field 14, featuring one half of even lines of a single frame of an interlaced scan format. The even field 14 of the pair 10 features lines of pixels 22 located in the same grid space as the lines of pixels 20 in the odd field 12, but only in correspondingly alternate rows 18 (even numbered horizontal lines, for example) which were missing pixels in the odd field 12, such that portions of the image not represented in the odd field 12 are now represented in the even field 14. Each field of the pair 10 includes pixels representative of one-half of a complete single image which was recorded, such that sequential scanning of both fields of pixels 12 and 14 is required for reconstructing the image.

Figure 2:
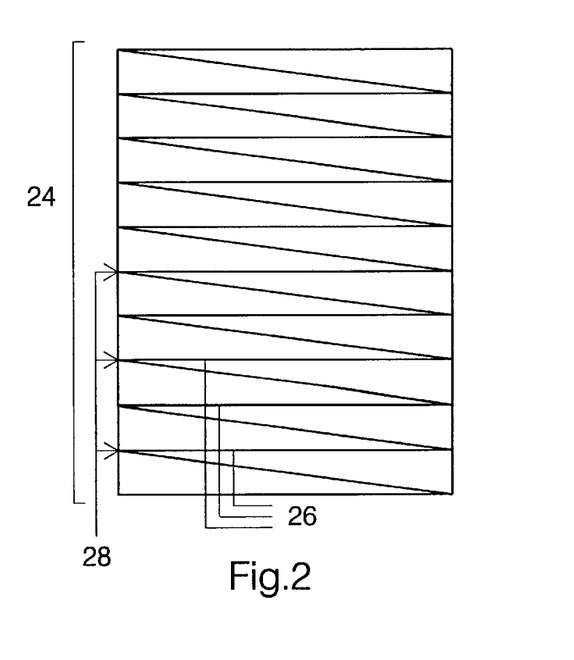
FIG. 2 is an illustration of a single frame (two fields at the same time) of a de-interlaced scanned format.

FIG. 2 shows an illustration of a single frame 24 (two fields at the same time) of a de-interlaced scanned format. Frame 24 includes horizontal lines of pixels 26 in both odd and even horizontal rows 28, such that scanning the single frame captures the entire image in contrast to the need for sequential scanning of both the odd field 12 and the even field 14 of the interlaced scanned format 10 of FIG. 1.

Figure 3:
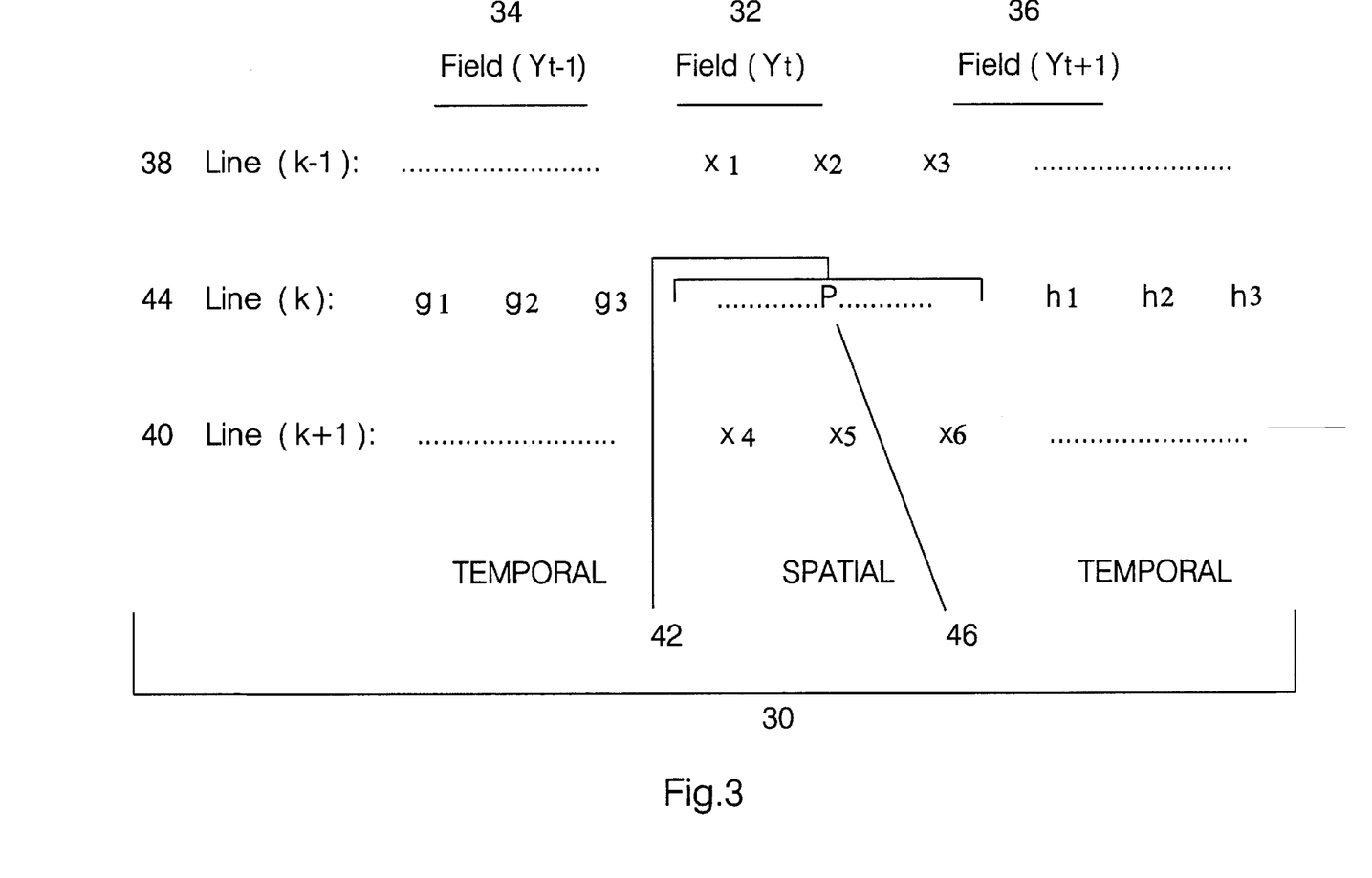
FIG. 3 shows an example of a matrix representation of pixel rid space for a given spatial field and immediate neighboring temporal fields of an interlaced video signal.

FIG. 3 shows an example of a matrix representation 30 of pixel grid space for a given spatial field and immediate neighboring temporal fields of an interlaced video signal. The matrix representation 30 is referred to in the corresponding preferred embodiment of a mixed mode spatial and temporal approximation method of the present invention (FIGS. 4 and 5), where a missing pixel (P 46 in FIG. 3), included in a sequence of interlaced fields of a video signal, is determined as part of the method of converting interlaced scanned format video signals to de-interlaced scanned format video signals.

In FIG. 3, matrix representation 30, a sequence of temporally related luminance fields is featured as Field ($Y_t$) 32, Field ($Y_{t-1}$) 34, and Field ($Y_{t+1}$) 36. At a given set time of receiving an interlaced video signal, Field ($Y_t$) 32 represents a current spatial field, Field ($Y_{t-1}$) 34 represents the previous temporal field, and Field ($Y_{t+1}$) 36 represents the next temporal field. The current spatial field, Field ($Y_t$) 32 includes spatial pixels $x_1$, $x_2$, and $x_3$ in Line (k−1) 38, and spatial pixels $x_4$, $x_5$, and $x_6$ in Line (k+1) 40. The horizontal line 42 is missing spatial pixels in Line (k) 44. The temporal fields, Field ($Y_{t-1}$) 34, and Field ($Y_{t+1}$) 36 include temporal pixels $g_1$, $g_2$, and $g_3$ in Line (k) 44, and temporal pixels $h_1$, $h_2$, and $h_3$ in Line (k) 44, respectively. Spatial pixel P 46, represents a missing spatial pixel located in Line (k) 44, of the current spatial field, Field ($Y_t$) 32. Spatial pixel P 46 is to be approximated from spatial information located in the current spatial field, Field ($Y_t$) 32, and from temporal information located in either one or both temporal fields, Field ($Y_{t-1}$) 34, and Field ($Y_{t+1}$) 36, using a mixed mode spatial and temporal approximation method of the present invention.

Figure 4:
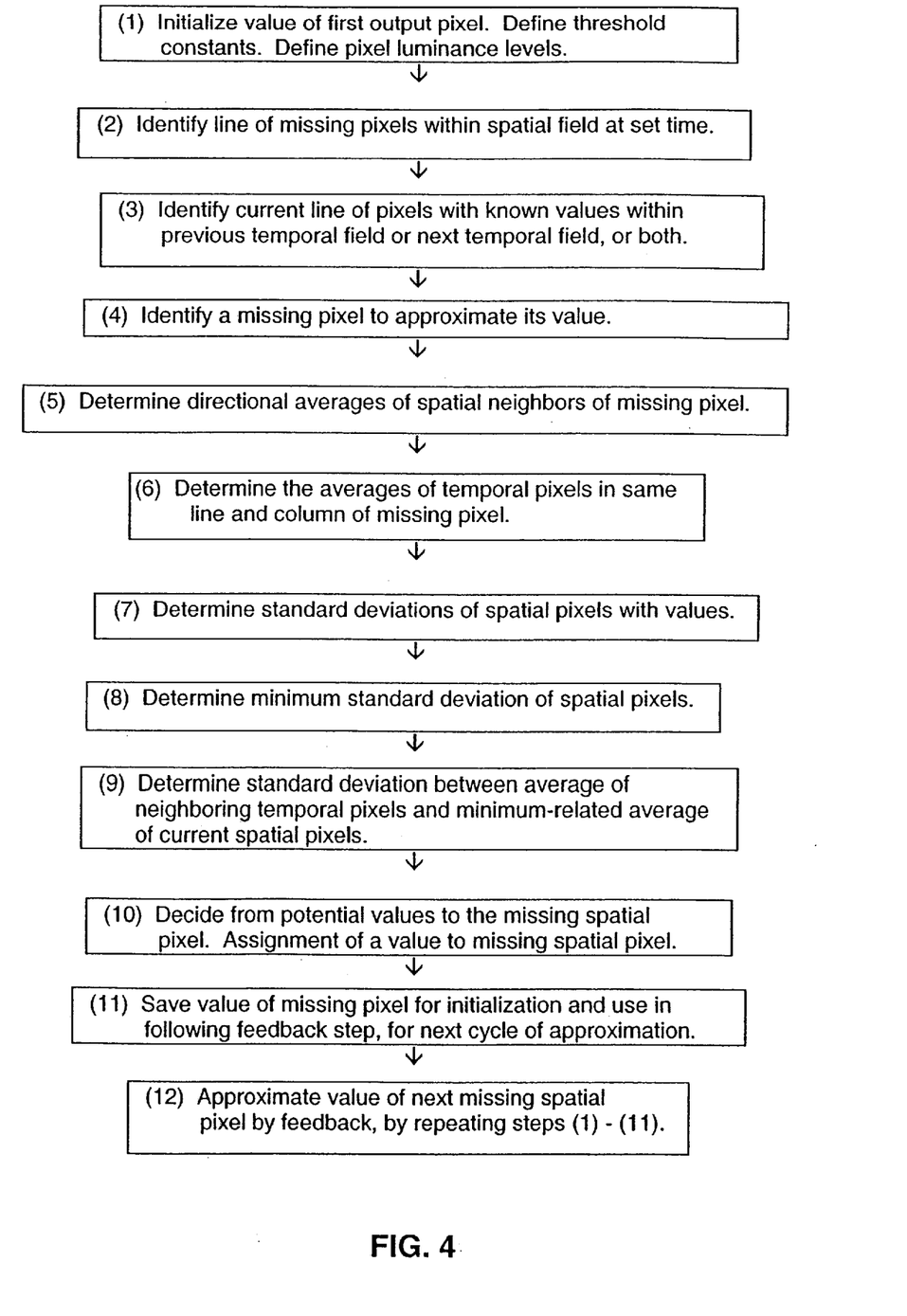
FIG. 4 is a flow diagram of a preferred embodiment of the method for de-interlacing a sequence of interlaced fields according to the present invention.

In FIG. 4, each principle step of the method of the video de-interlacing method of the present invention is numbered and enclosed inside a box. FIG. 5, (comprising FIG. 5/1, and FIG. 5/2 as continuation of FIG. 5/1), shows a preferred illustrative embodiment for implementing the method shown in FIG. 4, also as a flow diagram.

Referring to FIG. 4, a preferred embodiment of a method of video de-interlacing of the present invention is as follows.

In Step 1, initialization is performed, in which the value of the first output pixel, evaluated by using the de-interlacing approximation method, is initialized. Additionally, threshold constants and pixel luminance (brightness and darkness) levels, to be used later in the decision step (Step 10) of assigning a value to a missing pixel, are defined.

In Step 2, there is identification of a horizontal line of missing spatial pixels within a current spatial field, at a given set time.

In Step 3, there is identification of the current horizontal line of temporal pixels with known values, located within the previous temporal field or the next temporal field, or alternatively, located within both the previous temporal field and next temporal field, corresponding to the same horizontal line of missing spatial pixels within the current spatial field determined in Step 2, at the given set time.

In Step 4, identification is made of a missing spatial pixel whose value is to be approximated, in the line of missing spatial pixels.

In Step 5, determination is made of directional averages of the known spatial pixel neighbors of the missing spatial pixel, in the current spatial field of the horizontal line of missing spatial pixels, at the given set time.

In Step 6, determination is made of averages of known temporal pixels, located in the previous temporal field or in the next temporal field, or alternatively, located in both the previous temporal field and in the next temporal field, in the same horizontal line and the same column of the missing spatial pixel.

In step 7, determination is made of standard deviations of known spatial pixels located in the current spatial field of the missing spatial pixel.

In Step 8, determination is made of the minimum standard deviation of the standard deviations determined in Step 7.

In Step 9, there is determination of the standard deviation between the average of neighbor temporal pixels evaluated in Step 6, and the average of current spatial pixels related to the minimum standard deviation evaluated in Step 8.

Step 10 is a decision step, deciding from several potential values to the missing spatial pixel, based on evaluation of a series of logical operations of previously determined values. The decision step concludes with assignment of a value to the missing spatial pixel.

In Step 11, the approximated value of the missing pixel determined in Step 10, is saved for initialization of, and in performing the following feedback step, Step 12, for approximating a value of a next missing spatial pixel, in the next cycle of the approximation method. Completion of Step 11, represents completion of a single cycle of approximating values of missing pixels in grid space, using a mixed mode spatial and temporal approximation technique of the present invention, of an interlaced format video signal, prior to transmission of a de-interlaced video signal to an electronic visual display device.

Step 12 continues the approximation method by approximation of a value of a next missing spatial pixel by feedback, by repeating Steps 1 through 11.

FIG. 5, (comprising two pages as FIG. 5/1, and FIG. 5/2 as continuation of FIG. 5/1), shows a flow diagram of an exemplary preferred embodiment for implementing the video de-interlacing method shown in FIG. 4. The preferred embodiment of FIG. 5 is an example of implementing the video de-interlacing method of the present invention for approximating the value of missing pixel P 46, shown in FIG. 3, included in a field of a sequence of an interlaced video signal. Principle step numbers and titles of FIG. 5/1 and of FIG. 5/2 correspond to those appearing in FIG. 4. Notation and symbols appearing in FIG. 5/1 and in FIGS. 5/2 are consistent with those appearing in FIG. 3. For each principle method step, definitions of selected terms or components of that step, or of a substep to that step, are included, in addition to one or more substeps representing further of the indicated principle method step of the video de-interlacing method. In the following description of preferred embodiment featured in FIG. 5/1 and FIG. 5/2, definitions are indicated by a hyphen, substeps are indicated by a letter in parentheses, and the multiplication operation is indicated by an asterisk (*).

Referring to FIG. 5/1, Step 1 starts the mixed mode spatio-temporal approximation de-interlacing method with initialization of the first output pixel, definition of threshold constants, and definition of pixel luminance levels. Step (a) is the initialization of the value of the first output pixel, of the approximation method of an interlaced sequence of a video signal of the present invention, such as that shown in FIG. 3 for example, whereby the output value of a previous pixel (Previous-Result) is set equal to zero, (Previous-Result)=0. Additionally in Step 1, threshold constants, $A_i$, for i=1 to 8, and pixel luminance levels, including B=a darkness level (black level), and W=a brightness level (white level), are each defined. Threshold constants and luminance levels are used later for completing a decision step, involving evaluation of a series of logical operations leading to assignment of a value to a missing pixel.

In Step 2 identification is made of a horizontal line of missing pixels within a current spatial field, at a given set time. Step (a) involves setting-up a matrix representation of pixels of a sequence of an interlaced video signal, featuring spatial and temporal pixels within spatial and temporal interlaced fields, at a given set (current) time. These interlaced fields are to be de-interlaced by the present approximation method. The example used in this embodiment of the present invention relates to that appearing in FIG. 3. There it is shown that missing spatial pixels are located in horizontal line 42, in Line (k) 44.

In Step 3, there is identification of the current horizontal line of pixels with known values, located in the previous temporal field (Field ($Y_{t-1}$) 34, FIG. 3), or in the next temporal field (Field ($Y_{t+1}$) 36, FIG. 3), or located in both the previous temporal field (Field ($Y_{t-1}$) 34, FIG. 3) and in the next temporal field (Field ($Y_{t+1}$) 36, FIG. 3), corresponding to the same location as the horizontal line of missing spatial pixels within the current spatial field determined in Step 2 (FIG. 5/1) at the given set time. Successful implementation of the method of the present invention, requires input values of known pixels from at least one temporal field neighbor of the current spatial field featuring missing pixels. In step (a), reference is made to FIG. 3, where temporal pixels, with values locate din Line (k) 44, in the previous temporal Field ($Y_{t-1}$) 34, have values $g_1$, $g_2$, $g_3$, and temporal pixels with values, locate din Line (k) 44, in the next temporal Field ($Y_{t+1}$) 36, have values $h_1$, $h_2$, $h_3$. Temporal pixels with known values, located in at least one of the neighboring previous temporal field, or next temporal field, are used as inputs in the approximation method of the present invention.

In Step 4, identification is made of a missing pixel in the line of missing pixels, whose value is to be approximated by the method of the present invention. In step (a), reference is made to FIG. 3, where a missing spatial pixel P 46 location in Line (k) 44 of missing pixels, in spatial Field ($Y_t$) 32 is selected, as part of an example of implementation of the approximation method.

In Step 5, determination is made of directional averages of the known spatial pixel neighbors of the missing spatial pixel (P 46 in FIG. 3), located in the current field of the horizontal line of missing spatial pixels, at the given set time. In step (a), neighbor pixel values are obtained from the matrix representation of pixels in grid space (FIG. 3). Neighbor spatial pixels with values, located in Line (k−1) 38, and in Line (k+1) 40, in the current spatial Field ($Y_t$) 32 of the missing spatial pixel P 46, have values $x_1$, $x_2$, $x_3$, and $x_4$, $x_5$, $x_6$, respectively. In step (b), the directional averages, $m_i$, are evaluated, where $m_1=a_1x_1+a_2x_6$, $m_2=b_1x_2+b_2x_5$, and $m_3=c_1x_3+c_2x_4$, with $a_1+a_2=1$, $b_1+b_2=1$, and $c_1+c_2=1$, where coefficients $a_i$, $b_i$, and $c_i$ are positive constants.

In Step 6, determination is made of averages of values of known temporal pixels, located in the previous temporal field and in the next temporal field, in the same horizontal line and the same column of the missing spatial pixel (P 46 in FIG. 3). In step (a), previous and next field pixel values are obtained from the matrix representation of pixels in grid space (FIG. 3). Temporal pixels with values, located in Line (k) 44, in the previous temporal Field ($Y_{t-1}$) 34, have values $g_1$, $g_2$, and $g_3$, and temporal pixels with values, located in Line (k) 44, in the next temporal Field ($Y_{t+1}$) 36 have values $h_1$, $h_2$, and $h_3$. In step (b), temporal pixel average, $m_T$, is evaluated, where $m_T=d_1g_2+d_2h_2$, with $d_1+d_2=1$, and where coefficients $d_1$ and $d_2$ are positive constants, greater than or equal to zero. In step (c), temporal pixel average, $n_T$, is evaluated, where $n_T=e_1g_1+e_2h_1$, with $e_1+e_2=1$, and where coefficients $e_1$ and $e_2$ are positive constants, greater than or equal to zero.

According to the values of the coefficients, $d_1$, $d_2$, $e_1$, and $e_2$, the approximation method of the present invention requires input values from three fields of pixels (one current spatial field and two neighboring temporal fields), or input values from two fields of pixels (one current spatial field and one neighboring temporal field), for approximating missing pixels in the current spatial field. In the case of $d_1=0$ and $e_1=0$, $m_T=d_2H_2$, and $n_T=e_2h_1$, temporal pixel values ($h_1$ and $h_2$) from only one temporal field, the next temporal field (Field ($Y_{t+1}$) 36, FIG. 3), are needed for evaluation of $m_T$ and $n_T$, and ultimately evaluation of missing pixel P 46 (FIG. 3). Similarly, in the case of $d_2=0$ and $e_2=0$, $m_T=d_1g_2$, and $n_T=e_1g_1$, temporal pixel values ($g_1$ and $g_2$) from only one temporal field, the previous temporal field (Field ($Y_{t-1}$) 34, FIG. 3) are needed for evaluation of $m_T$ and $n_T$, and ultimately evaluation of missing pixel P 46 (FIG. 3). In other cases, in which neither $d_1=0$ and $e_1=0$, or $d_2=0$ and $e_2=0$, occurs, then there is a known value of at least one temporal pixel from each of both neighboring temporal fields (Field ($Y_{t+1}$) 36 and Field ($Y_{t-1}$) 34, FIG. 3), to the current spatial field (Field ($Y_t$) 32, FIG. 3) featuring the missing spatial pixel (P 46, FIG. 3) to be approximated, in the equations for evaluating $m_T$ and $n_T$, which are used in a later decision step (Step 10, FIG. 5/2) leading to evaluation of the missing spatial pixel (P 46, FIG. 3).

Continuation of the exemplary preferred embodiment of FIG. 5, appears in FIG. 5/2, where in Step 7, determination is made of standard deviations of spatial pixels with known values, located in the current spatial field of the missing spatial pixel (P 46 in FIG. 3). In step (a), standard deviations, Sigma i, are evaluated for i=1 to 3, where Sigma $1=s_1[abs(x_1-m_1)]$, Sigma $2=s_2[abs(x_2-m_2)]$, and Sigma $3=s_3[abs(x_3-m_3)]$, where $s_i$(for i=1 to 3) is a positive constant, and the term 'abs' appearing in the equations of Sigma $i=s_i[abs(x_i-m_i)]$, represents the absolute value of the term appearing in the parentheses, i.e., the absolute value of $(x_i-m_1)$. The equation used for evaluating the standard deviation of Sigma i, i.e., Sigma $i=s_i[abs(x_i-m_i)]$, is a known close approximation to the actual equation used for evaluating a standard deviation.

In Step 8, the minimum standard deviation of the standard deviations evaluated in Step 7 (FIG. 5/2) is determined. Step (a) features evaluation of the minimum standard deviation, Min=Sigma, from the set of Sigma i(i=1 to 3), where Min-Sigma=Min [Sigma i] for 1<=i<=3, and Min is a minimization operator. The term, $m_j$(where j=i) is defined as the average of spatial pixel values related to the minimum standard deviation, Min-Sigma.

In Step 9, there is determination of the standard deviation between the average of neighbor temporal pixels evaluated in Step 6 (FIG. 5/1), and the average of current spatial pixels related to the minimum standard deviation evaluated in Step 8 (FIG. 5/2). Step (a) features evaluation of the standard deviation, Sigma, where Sigma=$[abs(m_T-m_j)]$, and where $m_T$ and $m_j$ correspond to the average of neighbor temporal pixels evaluated in Step 6 (FIG. 5/1), and the average of current spatial pixels related to the minimum standard deviation evaluated in Step 8 (FIG. 5/2), respectively.

Step 10 is a decision step, in which a series of logical operations are evaluated leading to decision and assignment of a value to the missing spatial pixel (P 46 in FIG. 3). The decision step concludes with assignment of a value to the missing spatial pixel.

In step (a), there is evaluation of a series of logical operations [listed as (i) through (x) in the preferred embodiment of the present invention shown in FIG. 5/2] featuring comparisons of: linear combinations of a standard deviation (Sigma, or Min-Sigma); or of absolute magnitude of the difference between temporal pixel average, $m_T$, and a selected spatial pixel with a known value ($x_1$, $x_2$, $x_3$, $x_4$, $x_5$ or $x_6$); or of an average ($m_T$); or of the difference between a previously approximated missing pixel value (Previous-Result) and an average of temporal pixels ($n_T$); to linear combinations of threshold constants ($A_1$ through $A_8$) or pixel luminance levels (B, W), previously defined in Step 1 (FIG. 5/1). The series of logical comparisons features the following, whereby, if any one of the following logical operations [(i) through (x)] is correct, then the decision is to assign (Step (b)) a value to the missing spatial pixel (P 46 in FIG. 3):

(i) Sigma<=(K0+Min-Sigma), where $—C_0<=K0<C_0$, or (ii) Min-Sigma >=(W-K1), where $—C_1<=K1<C_1$, or (iii) abs $(m_T-x_1)<A1$, or (iv) abs $(m_T-x_2)<A2$, or (v) abs $(m_T-x_3)<A3$, or (vi) abs $(m_T-x_4)<A4$, or (vii) abs $(m_T-x_5)<A5$, or (viii) abs $(m_T-x_6)<A6$, or (ix) $m_T<=(B+K2)$, where $—C_2<=K2<C_2$, or (x) [(Previous-Result)$-n_T<=A6$] and [$m_T>=W-A7$], whereby the following additional logical comparison is evaluated, to assign a value to the missing spatial pixel (P 46 in FIG. 3): If Sigma<A8, the value of the missing spatial pixel (P 46 in FIG. 3) is assigned (Step (b)) as: $P=(m_T+m_j)*K3$, where 0<K3<1. However, if Sigma>= A8, the value of the missing spatial pixel (P 46 in FIG. 3) is assigned (Step (b)) as: $P=m_T$.

If none of the logical comparisons (i) through (x) is correct, then the decision is to assign (Step (b)) the value of missing spatial pixel (P 46 in FIG. 3) as: $P=m_j$.

In Step 10, the assigned value of missing spatial pixel (P 46 in FIG. 3) is obtained, in part, from input of known values of pixels located in either one, or two neighbor temporal fields (Field ($Y_{t-1}$) 36 and Field ($Y_{t-1}$) 34, FIG. 3), in addition to input of known values of pixels located in the current spatial field (Field ($Y_t$) 32, FIG. 3) featuring the missing spatial pixel (P 46, FIG. 3) to be approximated. As described in Step 6 (FIG. 5/1), and shown by the logical operations (equations) of Step )10, for the case in which the coefficients $d_1=0$ and $e_1=0$, then $m_T=d_2h_2$, and $n_T=e_2h_1$, or, for the case in which the coefficients $d_2=0$ and $e_2=0$, then $m_T=d_1g_2$, and $n_T=e_1g_1$, then the value of missing pixel P 46 (FIG. 3) is obtained using known values of pixels of only one neighbor temporal field, i.e., Field ($Y_{t+1}$) 36, or Field ($Y_{t-1}$) 34, and of the current spatial field, Field ($Y_t$) 32 featuring the missing pixel P 46, as shown in FIG. 3.

In Step 11, the approximated value of the missing pixel determined in Step 10, is saved for initialization of, and in performing the following feedback step, Step 12, for approximating a value of a next missing spatial pixel, in the next cycle of the approximation method. Completion of Step 11, represents completion of a single cycle of approximating values of missing pixels in grid space, using a mixed mode spatial and temporal approximation technique of the present invention, of an interlaced format video signal, prior to transmission of the de-interlaced video signal to an electronic visual display device.

In Step 12, continues the approximation method of the present invention, by approximation of a value of a next missing spatial pixel by feedback of (Previous-Result) from Step 11, and repeating Steps 1 through 11.

The method of the present invention, may be similarly implemented for the case of video interlaced RGB signals, whereby the above method (Steps 1 through 11, FIG. 5/1 and FIG. 5/2) is repeated for each color component (red, green, and blue).

The method of the present invention, may be similarly implemented for the case of video interlaced signals represented by luminance and chrominance components (for example, YUV, YCrCb), whereby the above method (Steps 1 through 11, FIG. 5/1 and FIG. 5/2) is repeated only for the luminance components (the Y part), and an approximation is performed for the chrominance components (the CrCb part), from information obtained from the decision step (Step 10).

While the invention has been described with respect to one embodiment, it will be appreciated that many variations, modifications and other applications of the invention may be made.

What is claimed is:

1. A method for de-interlacing an interlaced video format, the method comprising the steps of:
   (a) receiving the interlaced video format featuring a sequence of fields of pixels to be de-interlaced;
   (b) using a current spatial field featuring missing spatial pixels and said spatial pixels with known values, locate din said sequence of said fields, and at least one temporal field featuring temporal pixels with known values, located in said sequence of said fields, for determining values of said missing pixels of said current spatial field; and
   (c) feedback of said values of said missing pixels of said current spatial field for determination of next said missing pixels of said current spatial field.

2. The method of claim 1, wherein said at least one temporal field featuring said temporal pixels with said known values is selected from the group consisting of immediate previous said temporal field to said current spatial field located in said sequence of said fields, and immediate next said temporal field to said current spatial field located in said sequence of said fields.

3. The method of claim 1, further comprising the steps of:
   (c) evaluating logical operations of linear combinations of values selected from the group consisting of averages of said known values of said spatial pixels, averages of said known values of said temporal pixels, standard deviations of said known values of said spatial pixels, standard deviations of said known values of said temporal pixels, minimums of said standard deviations of said known values of said spatial pixels, absolute values of differences between said averages of said known values of said temporal pixels and said known values of said spatial pixels, said known values of said spatial pixels, and a plurality of constants, said logical operations selected from the group consisting of greater than, greater than or equal to, less than, less than or equal to, 'and', 'or', and 'xor'; and
   (d) deciding upon assignment of said values to said missing spatial pixels according to results of said logical operations.

4. The method of claim 3, wherein said plurality of constants is selected from the group consisting of a linear combination of a plurality of values of threshold constants, and a linear combination of a plurality of values of luminance levels of said missing pixels.

5. The method of claim 4, wherein said plurality of said values of said luminance levels of said missing pixels includes a plurality of values of darkness and a plurality of values of brightness.

6. The method of claim 1, wherein said assigned values to said missing pixels feature linear combinations of averages of said pixels with said known value.

7. A method for de-interlacing an interlaced video format, the method comprising the steps of:
   (a) receiving the interlaced video format feature a sequence of fields of pixels to be de-interlaced;
   (b) evaluating logical operations of linear combinations of values selected from the group consisting of averages of known values of spatial pixels, averages of said known values of temporal pixels, standard deviations of said known values of said spatial pixels, standard deviations of said known values of said temporal pixels, minimums of said standard deviations of said known values of said spatial pixels, absolute values of differences between said averages of said known values of said temporal pixels and said known values of said spatial pixels, said known values of said spatial pixels, and a plurality of constants, said logical operations selected from the group consisting of greater than, greater than or equal to, less than, less than or equal to, 'and', 'or', and 'xor'; and (c) deciding upon assignment of values to missing spatial pixels according to results of said logical operations.

8. The method of claim 7, wherein said sequence of fields of pixels to be de-interlaced features a current spatial field featuring missing spatial pixels and said spatial pixels with known values located in said sequence of aid fields, and at least one temporal field featuring said temporal pixels with said known values located in said sequence of said fields.

9. The method of claim 8, wherein said at least one temporal field featuring said temporal pixels with said known values is selected from the group consisting of immediate previous said temporal field to said current spatial field located in said sequence of said fields, and immediate next said temporal field to said current spatial field located in said sequence of said fields.

10. The method of claim 7, wherein said plurality of constants is selected from the group consisting of a linear combination of a plurality of values of threshold constants, and a linear combination of a plurality of values of luminance levels of said missing pixels.

11. The method of claim 10, wherein said plurality of said values of said luminance levels of said missing pixels includes a plurality of values of darkness and a plurality of values of brightness.

12. The method of claim 7, wherein said assigned values to said missing pixels feature said linear combinations of said averages of said pixels with said known values.

13. The method of claim 7, further comprising the step of:

(d) feedback of said values of said missing pixels of said current spatial field for determination of next said missing pixels of said current spatial field.

14. A method for de-interlacing an interlaced video format, the method comprising the steps of:

(a) receiving the interlaced video format featuring a sequence of fields of pixels to be de-interlaced;

(b) using a current spatial field featuring missing spatial pixels and said spatial pixels with known values, located in said sequence of said fields, and one temporal field featuring temporal pixels with known values, located in said sequence of said fields, for determining values of said missing pixels of said current spatial field;

(c) evaluating logical operations of linear combinations of values selected from the group consisting of averages of said known values of said spatial pixels, averages of said known values of said temporal pixels, standard deviations of said known values of said spatial pixels, standard deviations of said known values of said temporal pixels, minimums of said standard deviations of said known values of said spatial pixels, absolute values of differences between said averages of said known values of said temporal pixels and said known values of said spatial pixels, said known values of said spatial pixels, and a plurality of constants, said logical operations selected from the group consisting of greater than, greater than or equal to, less than, less than or equal to, 'and', 'or', and 'xor'; and (d) deciding upon assignment of said values to said missing spatial pixels according to results of said logical operations.

15. The method of claim 14, wherein said one temporal field featuring said temporal pixels with said known values is selected from the group consisting of immediate previous said temporal field to said current spatial field located in said sequence of said fields, and immediate next said temporal field to said current spatial field located in said sequence of said fields.

16. The method of claim 14, wherein said plurality of constants is selected from the group consisting of a linear combination of a plurality of values of threshold constants, and a linear combination of a plurality of values of luminance levels of said missing pixels.

17. The method of claim 16, wherein said plurality of said values of said luminance levels of said missing pixels includes a plurality of values of darkness and a plurality of values of brightness.

18. The method of claim 14, wherein said assigned values to said missing pixels feature linear combinations of averages of said pixels with said known values.

19. The method of claim 14, further comprising the step of:

(c) feedback of said values of said missing pixels of said current spatial field for determination of next said missing pixels of said current spatial field.

* * * * *